United States Patent [19]
Freed

[11] Patent Number: 5,918,038
[45] Date of Patent: Jun. 29, 1999

[54] GENERAL METHOD FOR DETERMINING THE VOLUME AND PROFILE AREA OF A SECTIONED CORPUSCLE

[76] Inventor: Jeffrey A. Freed, 204 2nd St., S.W., Puyallup, Wash. 98371

[21] Appl. No.: 08/928,193

[22] Filed: Sep. 12, 1997

[51] Int. Cl.$^6$ .................................................. G06G 7/48
[52] U.S. Cl. .................................................. 395/500.32
[58] Field of Search ............................................. 364/578

[56] References Cited

U.S. PATENT DOCUMENTS 5,477,334  12/1995  Keswani et al. ......................... 356/405

OTHER PUBLICATIONS

McCready RW, Papadimitriou J M. An Analysis of DNA cytomorphometry on tissue sections in a rat liver model. Analytical and Quantitative Cytology 5:117–123, 1983.
Nikonenko AG. The cell sectioning model: Nuclear/cytoplasmic ratio studied by computer simulation. Analytical and Quantitative Cytology and Histology 18: 23–34, 1996.
Baba, N: Computer–aided three–dimensional reconstruction from serial section images. In Hader DP ed. Image Analysis in Biology, CRC Press, pp. 251–270, 1991.
Gundersen et al.: Stereological estimation of the volume–weighted mean volume of arbitrary particles observed on random section, J. Microsc. vol. 138; pp. 127–142, 1985.
Cruz–Orive et al.: Recent Stereological methods for cell biology: a brief survey, Am. J. Physiol., vol. 258; pp. L148–L156, 1990.
Kubinova: Advantages of sterological methods in biomedicine. Efficiently obtaining unbiased estimates of geometrical charactertics for 3–D structures, IEEE Engineering in Medicine and Biology Magazine, vol. 17; pp. 110–115, 1998.

*Primary Examiner*—Kevin J. Teska
*Assistant Examiner*—Hugh Jones

[57] ABSTRACT

A method for obtaining the profile area and volume of any specified section of any specified corpuscle is disclosed. The operator operates a personal computer running a program which includes a general representation of the corpuscle to be sectioned. The operator specifies two coordinate rotation angles and two section positions, as well as additional attributes of the corpuscle representation, in response to prompts on a video screen, using a keyboard. The program superimposes a unit cubic lattice on the corpuscle representation. Two coordinate rotations are performed defining a new X'-Y' plane, and two sectioning planes are drawn parallel to a new X'-Y' plane. The new X'-Y' plane is subdivided into unit squares. The program then examines each lattice point in turn. The volume of the corpuscle section is obtained by counting the total number of those lattice points which lie in the interior of the corpuscle between the sectioning planes; the profile area of the corpuscle section is obtained by counting the total number of unit squares which contain the orthogonal projection of at least one of those lattice points.

12 Claims, 2 Drawing Sheets

GENERAL METHOD FOR DETERMINING THE VOLUME AND PROFILE AREA OF A SECTIONED CORPUSCLE

RELATED APPLICATIONS

This invention, in some of its embodiments, is used in conjunction with the transmission of my U.S. patent application Ser. No. 08/929,273, Method for Correction of Quantitative DNA Measurements in a Tissue Section.

1. Field of Invention

This invention relates to corpuscle sectioning, and more particularly, to the determination of the volume and profile area of a corpuscle section.

2. Description of the Prior Art

The volume of a centrally-sectioned sphere is known in the prior art and is calculated using the equation: $V=\pi R^2 T - \pi(3Z^2T+T^3/4)/3$ due to McCready and Papadimitriou, where T is the section thickness; R, the radius of the sphere; Z, the vertical coordinate defining the sectioning planes (where Z=0 at the center of the sphere); and V, the volume of the sphere section.

(An Analysis of DNA Cytophotometry on Tissue Sections in a Rat Liver Model, published in Analytical and Quantitative Cytology, Vol. 5, pp. 117–123, 1983). Nikonenko subsequently described a method of determining the profile area of an infinitely thin section of an ellipsoid of revolution, where the ellipsoid, the section angles, and the section position are specified by the operator (The Cell Sectioning Model: Nuclear/Cytoplasmic Ratio Studied by Computer Simulation, published in Analytical and Quantitative Cytology and Histology, Vol. 18, pp. 23–34, 1996). Nikonenko's method does not permit determination of section volume, and is limited to ellipsoids of revolution.

There is no general method in the prior art for determining the volume and profile area of any specified corpuscle section. Such a method would be of great value in modeling cell nuclei in a tissue section, and would have direct application to the study of methods which attempt to correct quantitative DNA measurements in tissue sections. The lack of such a general method for determining the volume and profile area of sectioned corpuscles has left investigators without an effective way to study the performance of their correction algorithms, and skeptical of the feasibility of correcting quantitative DNA measurements in tissue sections. These problems and issues are well known to those skilled in the art (see Freed J A, Possibility of Correcting Image Cytometric Nuclear DNA (Ploidy) Measurements in Tissue Sections: Insights from Computed Corpuscle Sectioning and the Reference Curve Method, published in *Analytical and Quantitative Cytology and Histology*, Vol. 19, pp. 376–386, 1997, and the references cited therein).

SUMMARY OF THE INVENTION

The object of the present invention is to provide a general method for the determination of the profile area and volume of any specified section of any corpuscle that can be described by one or more equations or inequalities, or as a list of points that lie within the corpuscle. This invention provides a method of modeling cell nuclei and partial nuclei in a tissue section. The synthetic data this invention generates derive from a corpuscle with exact operator-specified attributes. For example, the volumes and profile areas of a plurality of randomly-oriented, randomly-positioned ellipsoidal model nuclei of specified eccentricity and size, sectioned at a specified section thickness, can be easily obtained. These synthetic data can be compared to measured data in an actual tissue section, and the characteristics of the nuclei as they existed prior to sectioning can thereby be inferred. These synthetic data can also be used as input into algorithms for correction of quantitative DNA measurements in tissue sections. The performance of these algorithms can then be related to the specified attributes of the model nuclei in each case. For example, the effect of nuclear ellipticity on the efficacy of a correction algorithm can be studied. The application of correction algorithms to correct quantitative DNA measurements in tissue sections is well known to those of ordinary skill in the art and is amply discussed in the prior art. (See Freed J A, Possibility of Correcting Image Cytometric Nuclear DNA (Ploidy) Measurements in Tissue Sections: Insights From Computed Corpuscle Sectioning and the Reference Curve Method, published in *Analytical and Quantitative Cytology and Histology*, Vol. 19, pp. 376–386, 1997, and the references cited therein). The value of the synthetic data produced by the present invention is obvious to those of ordinary skill in the art. There is no prior art which allows these applications.

Figure 1:
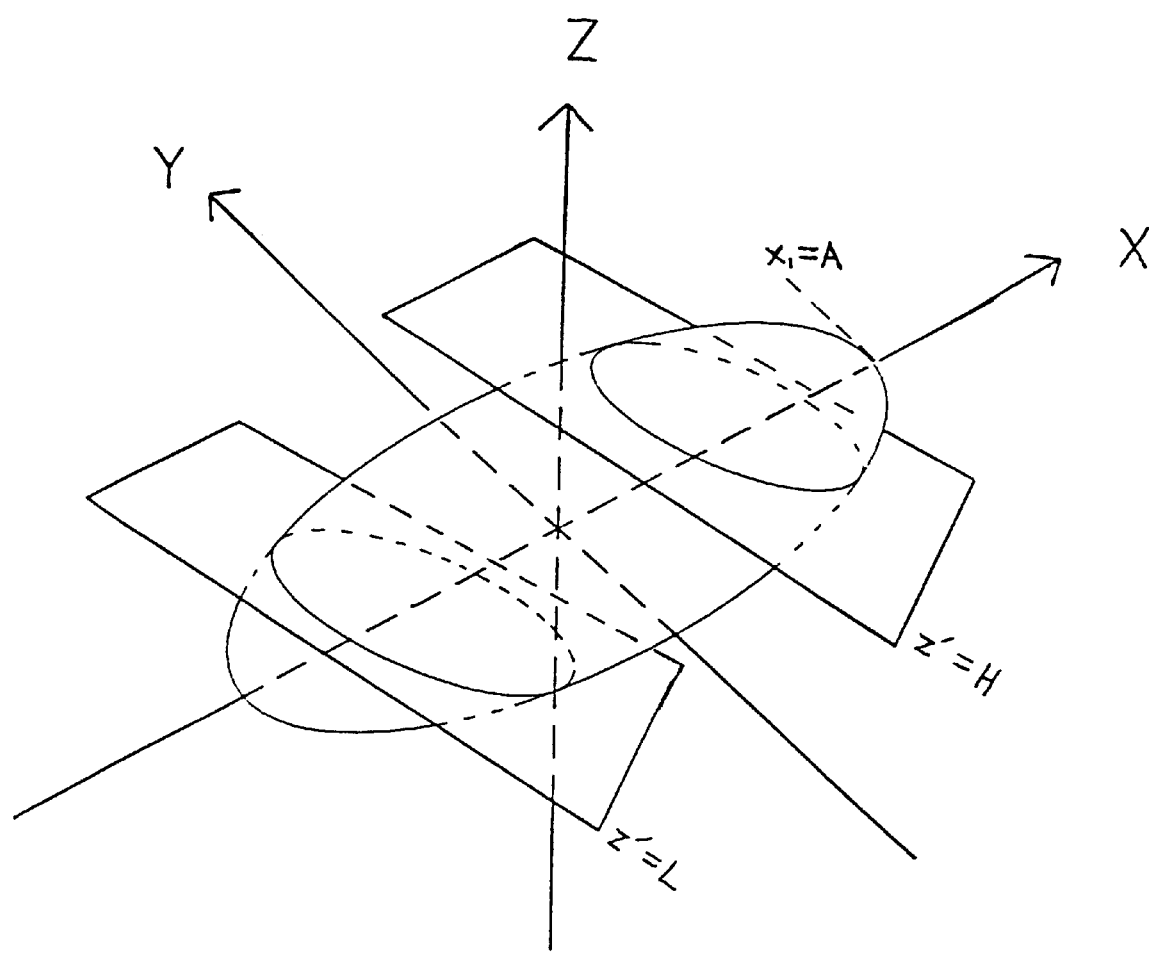
FIG. 1 is a representation of an ellipsoid centered at the origin of a three-dimensional cartesian coordinate system, being sectioned by two planes.

The reference numbers in the drawings are listed below:
- 12 enter parameter values
- 13 program selects each point of the lattice in sequence
- 14 program proceeds to next lattice point when current point does not lie within the ellipsoid
- 15 if lattice point lies within the ellipsoid, the program proceeds to calculate
- 16 the program calculates the coordinates of the current lattice point in the new twice-rotated coordinate system
- 17 program evaluates whether the current lattice point lies between the two sectioning planes
- 18 program abandons current lattice point and advances to next lattice point
- 19 program continues calculations on current lattice point
- 20 program adds one to value of $V_s$
- 21 program assigns unit value to cell of data array corresponding to the orthogonal projection of current lattice point onto a unit square of the new X'-Y' plane
- 22 program evaluates whether all lattice points have been evaluated
- 23 the last lattice point has been evaluated
- 24 program calculates the profile area and volume of the section
- 25 program writes data to disk and halts

DETAILED DESCRIPTION OF THE INVENTION

In accordance with the present invention, a process for determining the profile area and volume of any specified section of any specified corpuscle comprises a computer program in which the corpuscle to be sectioned is represented by one or more equations or inequalities, or as a list of representative interior points. The program superimposes on the corpuscle a unit cubic lattice. Each point in this lattice is evaluated in sequence. Two coordinate rotations are performed, creating a new X'-Y' plane, which is then partitioned into unit squares. Two sectioning planes are drawn parallel to the new X'-Y' plane. Each lattice point which lies in the interior of the corpuscle between the sectioning planes is counted as a unit volume, and each unit square which contains the orthogonal projection of at least one such lattice point is counted as a unit area. The program determines the volume of the sectioned corpuscle as the sum of these unit volumes, and the profile area of the sectioned corpuscle as the sum of these unit areas.

In the preferred embodiment, a program written in Turbo Pascal Version 7.0 (Borland International, Inc., Scotts Valley, Calif.) runs on an IBM-compatible personal computer equipped with random access memory, a processor, a math coprocessor, a hard drive, a floppy disk drive, a keyboard, a video monitor, and a printer.

The corpuscle to be sectioned is the space enclosed within an ellipsoid of revolution around the X-axis, which is represented by the inequality $x^2/A^2+(y^2+z^2)/B^2<1$. A is the semiaxis of revolution and B is the other semiaxis, and the ellipsoid is centered at the origin of a three-dimensional cartesian coordinate system (FIG. 1).

Questions are displayed on a video monitor, prompting the operator to enter real number values for the following parameters using a keyboard: A, the semiaxis of revolution of the ellipsoid; B, the other semiaxis of the ellipsoid, $\theta_1$, the angle of the first coordinate rotation (around the Z-axis); $\theta_2$, the angle of the second coordinate rotation (around the rotated Y-axis); and H and L, where z'=H is the equation of the top sectioning plane and z'=L is the equation of the bottom sectioning plane in the new (twice-rotated) coordinate system.

The program superimposes a unit cubic lattice on the corpuscle. A pair of coordinate rotations is performed according to the parameter values entered by the operator (see above), thus defining a new X'-Y' plane. Those lattice points which lie in the interior of the corpuscle and which lie between the sectioning planes (the corpuscle section lattice points) are counted to yield the corpuscle section volume. The program divides the new X'-Y' plane into unit squares; the total number of unit squares that contain the orthogonal projection or projections of at least one corpuscle section lattice point is the profile area of the corpuscle section.

Figure 2:
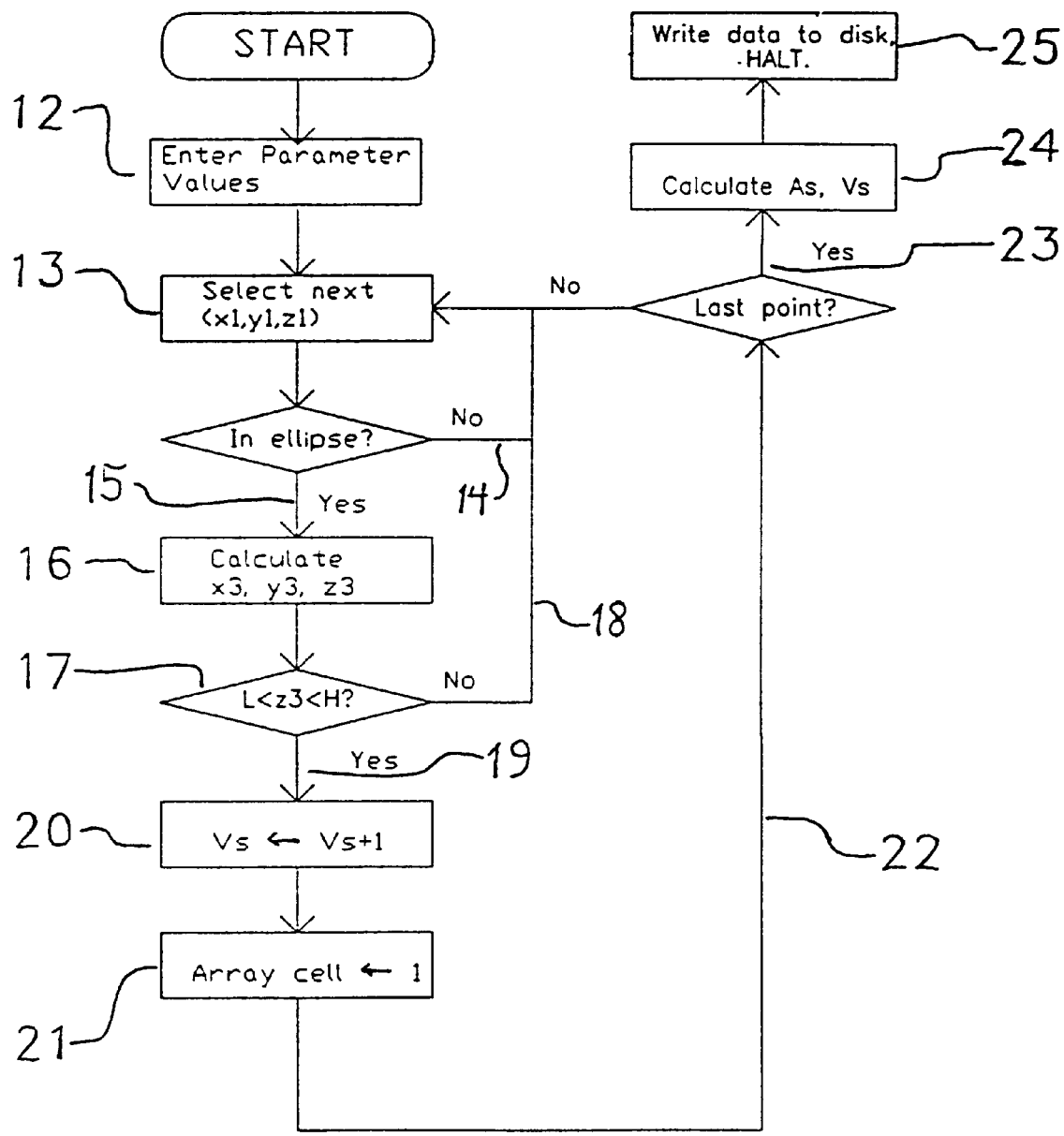
FIG. 2 is a flow diagram of the program logic.

Please refer now to FIG. 2. The operator enters, using the keyboard, real number values for A, B, $\theta_1$, $\theta_2$, H, and L 12. The program assigns to the variable, C, the absolute value of A or B, whichever is larger. H may range from C+T to −C. A two-dimensional data array with dimensions (C+2)×(C+2) is initialized, setting all cells equal to zero. A variable, $V_s$, is also set equal to zero. The program now increments from −(B+1) to B+1, one unit per step—the outer loop; at each such step, the program increments from −(A+1) to A+1, one unit per step—the middle loop; at each such step, the program increments from −(B+1) to B+1, one unit per step—the inner loop. At each step 13 of the inner loop, the following procedure is performed:

The current value of the inner loop variable is assigned to variable $Z_1$;

the current value of the middle loop variable is assigned to variable $x_1$;

the current value of the outer loop is assigned to variable $y_1$;

if $x^2/A^2+(y^2+z^2)/B^2>1$ then the inner loop increments one step directly 14, else 15 the following calculations are performed 16:

The first coordinate rotation is performed:

$x_2 = x_1 \cos(\theta_1) + y_1 \sin(\theta_1)$;

$y_2 = y_1 \cos(\theta_1) - x_1 \sin(\theta_1)$;

$z_2 = z_1$;

and the second coordinate rotation is performed:

$x_3 = x_2 \cos(\theta_2) + z_2 \sin(\theta_2)$;

$y_3 = y_2$;

$z_3 = z_2 \cos(\theta_2) - x_2 \sin(\theta_2)$.

Now, $z_3$ is evaluated 17. If $z_3$ does not lie between L and H 18, then the inner loop increments one step directly. But if $L<z_3<H$ 19, then 20 $V_s$ is set equal to $V_s+1$, and the cell in the two-dimensional array, the row of which is $x_3$ rounded to the nearest integer, and the column of which is $y_3$ rounded to the nearest integer, is set 21 equal to 1, and the inner loop increments one step 22.

When all steps in all the loops have been completed 23, all of the non-zero cells in the two-dimensional array are summed to yield the profile area, $A_s$, of the section of the corpuscle which lies between the sectioning planes, and $V_s$ is the volume of that section 24. These data are then written to a data file on the hard drive or on a floppy disk, and the program halts 25.

The source code is included at the end of the specification.

SUMMARY, RAMIFICATIONS, AND SCOPE

Accordingly, the reader will see that the method of this invention can be used to obtain the profile area and volume of a specified corpuscle. The essence of the present invention is the use of coordinate rotations and the enumeration of points in a cubic lattice overlying the corpuscle to be sectioned, which provide the means to determine the corpuscle section volume and profile area. Consequently, this invention is also embodied in many different computer programs, in which the corpuscle to be sectioned is represented by different equations. It would also be possible to represent the object to be sectioned by a list of points internal to the object. Then, using U.S. Pat. No. 5,477,334 to Bemis Manufacturing Company, each lattice point can be classified as lying within, or outside of, the corpuscle; it is not necessary that the corpuscle be amenable to description by one or more equations or inequalities.

An important alternate embodiment repeatedly sections a predetermined corpuscle, each time determining the two coordinate rotation angles and the positions of the two sectioning planes using a random number generator, and then writes the data points [(Vs1,As1), (Vs2,As2) . . . (Vsn,Asn)] to a data file. This data file may be used in conjunction with the invention disclosed in my co-pending patent application, Method for Correction of Quantitative DNA Measurements in a Tissue Section, to simulate data of cell nuclei and partial nuclei in a Feulgen-stained histologic tissue section. The efficacy of correcting quantitative DNA measurements in tissue sections can then be studied for any specified model nucleus, which is a major advance in the field. Further modifications include weighting some of the corpuscle section lattice points differently than others to simulate inhomogeneous DNA concentration within the model nucleus.

The field of stereology studies methods of predicting the attributes of corpuscles from the measurable attributes of sections of those corpuscles. The present invention will allow stereologists to understand the process of sectioning non-spherical corpuscles in a powerful new way that has not been possible previously.

Although the description of the preferred embodiment of the present invention contains many specificities, these should not be construed as limiting the scope of the invention but as merely providing an illustration of the presently preferred embodiment of this invention. Thus, the scope of the invention should be determined by the appended claims and their legal equivalents, rather than by the example given.

```
PROGRAM CCS;
{N$+}
Const
pi: real=3.141593;
Type
template=array[1..170,1..170] of integer;
templ2=array[1..2,1..170] of real;
Var
datar: templ2;
zarray: template;
vs,as,a,b,h,l,theta1,theta2,at: real;
bnfile: file of real;
fname: string[15];
Procedure initialize;
begin
writeln('Enter destination file name:'); readln(fname);
writeln('Enter length of semiaxis of revolution:'); readln(a);
writeln('Enter length of other semiaxis:'); readln(b);
writeln('Enter first angle of rotation in radians:'); readln(theta1);
writeln('Enter second angle of rotation in radians:'); readln(theta2);
writeln('Enter distance of top sectioning plane from origin:'); readln(h);
writeln('Enter distance of bottom sectioning plane from origin:'); readln(l);
end;
Procedure clearar;
var
i,j: integer;
begin
for i:=1 to 170 do
begin for j:=1 to 170 do
begin
zarray[i,j]:=0; end; end;
for i:=1 to 2 do
begin for j:=1 to 170 do
begin datar[i,j]:=0; end; end;
vs:=0; as:=0;
end;
Procedure main;
var
x1,y1,z1: integer;
c,x2,y2,z2,x3,y3,z3: real;
begin
if abs(a)>abs(b) then c:=a else c:=b;
for y1:=-(trunc(b)-1) to (trunc(b)+1 do
begin for x1:=-(trunc(a)-1) to (trunc(a)+1 do
begin for z1:=-(trunc(b)-1) to (trunc(b)+1 do
begin if x1*x1/(a*a)+(y1*y1+z1*z1)/(b*b)<1 then
begin
x2:=x1*cos(theta1)+y1*sin(theta1);
y2:=y1*cos(theta1)-x1*sin(theta1);
z2:=z1;
x3:=x2*cos(theta2)+z2*sin(theta2);
y3:=y2;
z3:=z2*cos(theta2)-x2*sin(theta2);
if(z3<h) and (z3>l) then
begin zarray[round(x3+a+1),round(y3+a+1)]:=1;
vs:=vs+1; end; end; end;
end; end;
end;
Procedure finishup;
var
i,j,: integer;
begin
for i:=1 to 170 do
begin for j:=1 to 170 do
begin as:=as+zarray[i,j]; end; end;
writeln('Area =',as);
writeln('Volume =',vs);
writeln('Enter any value to quit'); readln(at);
assign(bnfile,vs; write(bnfile,as);
close(bnfile);
end;
BEGIN
initialize; clearar; main; finishup;
END
```

I claim:

1. A process of operating a general purpose data processor of known type to enable said data processor to simulate the sectioning of a predetermined object of any specified volume and shape at any specified section angles and any specified section positions, to determine the section volume and section profile area of a predetermined section of said predetermined object, comprising the steps of:

(a) forming an object representation of said object, and (b) providing lattice means of specifying a plurality of cubic lattice points completely encompassing said object representation, and (c) providing parameter means of inputting into a working memory of said data processor parameter values corresponding to said specified section angles and said specified section positions, and (d) providing plane means of mathematically describing two sectioning planes according to said parameter values, and (e) providing means of identifying and counting all section points, consisting of those of said lattice points which:

(1) lie in the interior of said object representation, and (2) lie between said two sectioning planes, and (f) determining said section volume as the total number of said section points, and (g) determining said section profile area as the total number of unit squares on one of said sectioning planes that contain the orthogonal projection or projections of at least one of said section points, and (h) providing means of storing said section volume and said section profile area in a memory of said data processor, whereby said section volume and said section profile area are determined according to said parameter values.

2. The process of claim 1 wherein said data processor is a personal computer.

3. The process of claim 1 wherein said predetermined object is a tangible physical object.

4. The process representation of claim 1 wherein said object representation is a list of representative interior points.

5. The process of claim 1 wherein said object representation is defined by one or more equations or inequalities.

6. The process of claim 5 wherein said object representation is the interior of an ellipsoid.

7. The process of claim 1 wherein said object representation is a model of a cell nucleus in a tissue section.

8. The process of claim 1 wherein said object representation is a list of points.

9. The process of claim 1 wherein said parameter means is a user interface for entering said parameter values.

10. The process of claim 9 wherein said user interface displays a list of questions displayed on a video monitor and a keyboard for entering said parameter values.

11. The process of claim 1 wherein said plane means performs steps of:
(a) performing two mutually orthogonal coordinate rotations on a three dimensional cartesian coordinate system according to said parameter values of claim 1 to create a rotated coordinate system, and
(b) drawing said two sectioning planes of claim 1 parallel to a plane selected from the group consisting of the xy plane, the xz plane, and the yz plane in said rotated coordinate system, and
(c) drawing said two sectioning planes of claim 1 according to said parameter values of claim 1.

12. The process of claim 1 wherein said parameter values are determined by a random number generator.

* * * * *